United States Patent
Long et al.

(10) Patent No.: US 12,115,858 B2
(45) Date of Patent: Oct. 15, 2024

(54) ADJUSTABLE DROP TRANSMISSION ASSEMBLY FOR A WORK VEHICLE

(71) Applicant: Deere & Company, Moline, IL (US)

(72) Inventors: Randall L. Long, Coffeyville, KS (US); Lloyd D. Martin, Asbury, MO (US)

(73) Assignee: DEERE & COMPANY, Moline, IL (US)

( * ) Notice: Subject to any disclaimer, the term of this patent is extended or adjusted under 35 U.S.C. 154(b) by 213 days.

(21) Appl. No.: 17/857,720

(22) Filed: Jul. 5, 2022

(65) Prior Publication Data

US 2024/0010064 A1    Jan. 11, 2024

(51) Int. Cl.
*B60K 6/547*  (2007.10)
*B60K 17/10*  (2006.01)
*B60K 17/28*  (2006.01)
*E02F 9/20*   (2006.01)

(52) U.S. Cl.
CPC ............ *B60K 6/547* (2013.01); *B60K 17/105* (2013.01); *B60K 17/28* (2013.01); *E02F 9/202* (2013.01); *B60Y 2200/41* (2013.01)

(58) Field of Classification Search
CPC ...... B60K 6/547; B60K 17/105; B60K 17/28; E02F 9/202; B60Y 2200/41
See application file for complete search history.

(56) References Cited

U.S. PATENT DOCUMENTS

| | | | |
|---|---|---|---|
| 2,974,538 A * | 3/1961 | Jennings | ............. F16H 57/0493 74/606 R |
| 5,095,767 A * | 3/1992 | Spridco | .................... F16H 1/20 74/606 R |
| 11,091,018 B2 | 8/2021 | Ore et al. | |
| 2021/0249935 A1 | 8/2021 | Long et al. | |
| 2021/0291806 A1 | 9/2021 | Forte et al. | |

(Continued)

FOREIGN PATENT DOCUMENTS

| | | |
|---|---|---|
| DE | 102021203379 A1 | 10/2021 |
| WO | 2020187878 A1 | 9/2020 |

OTHER PUBLICATIONS

German Search Report issued in application No. DE102023110970.7 dated Dec. 7, 2023 (04 pages).

*Primary Examiner* — Terence Boes
(74) *Attorney, Agent, or Firm* — KLINTWORTH & ROZENBLAT IP LLP

(57) ABSTRACT

A transmission assembly for a work vehicle includes a housing that accommodates first and second transmission shafts, a gear arrangement that provides a selective gear reduction for transmission of power between the first and second transmission shafts, and a quill structure secured to the housing that supports the first transmission shaft. The quill structure is couplable to the housing in a first orientation and a second orientation to vary a vertical spacing between the first and second transmission shafts. A bearing bore in the quill structure is formed at a vertically offset location of the quill structure and receives the first transmission shaft. The vertical spacing between the first transmission shaft and the second transmission shaft may be set at a first vertical distance or at a second vertical distance based on the quill structure being coupled to the housing in the first orientation or in the second orientation, respectively.

20 Claims, 10 Drawing Sheets

(56) References Cited

U.S. PATENT DOCUMENTS

| | | |
|---|---|---|
| 2021/0309099 A1 | 10/2021 | Long |
| 2021/0388825 A1 | 12/2021 | Watt et al. |
| 2022/0032763 A1 | 2/2022 | Lang et al. |

* cited by examiner

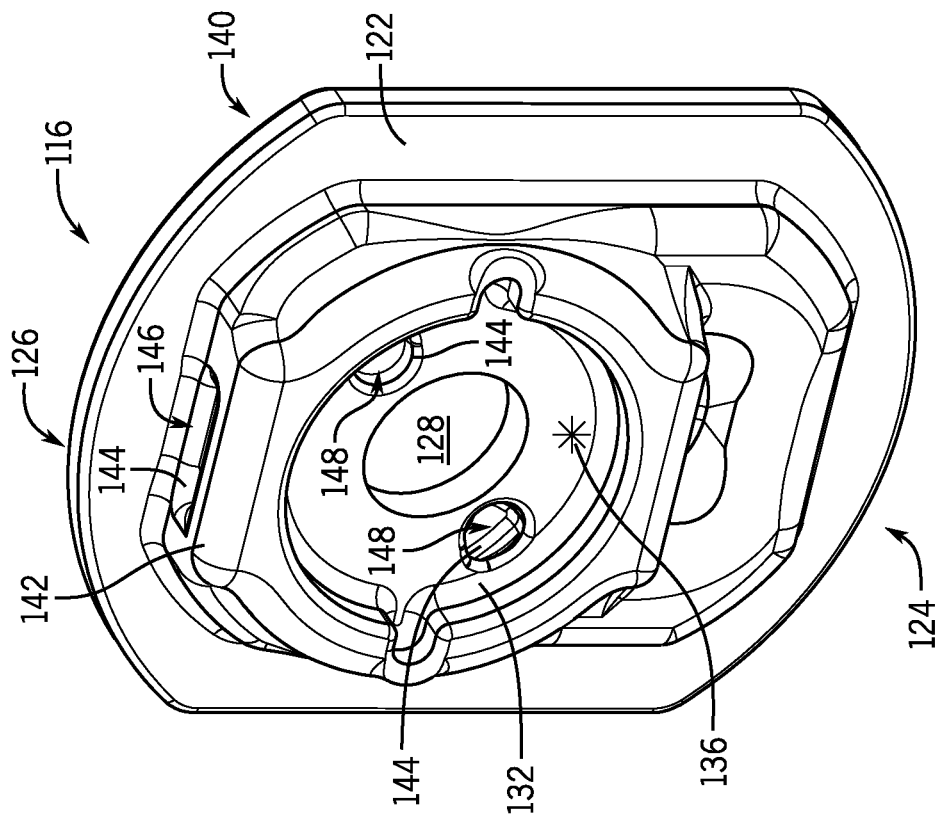
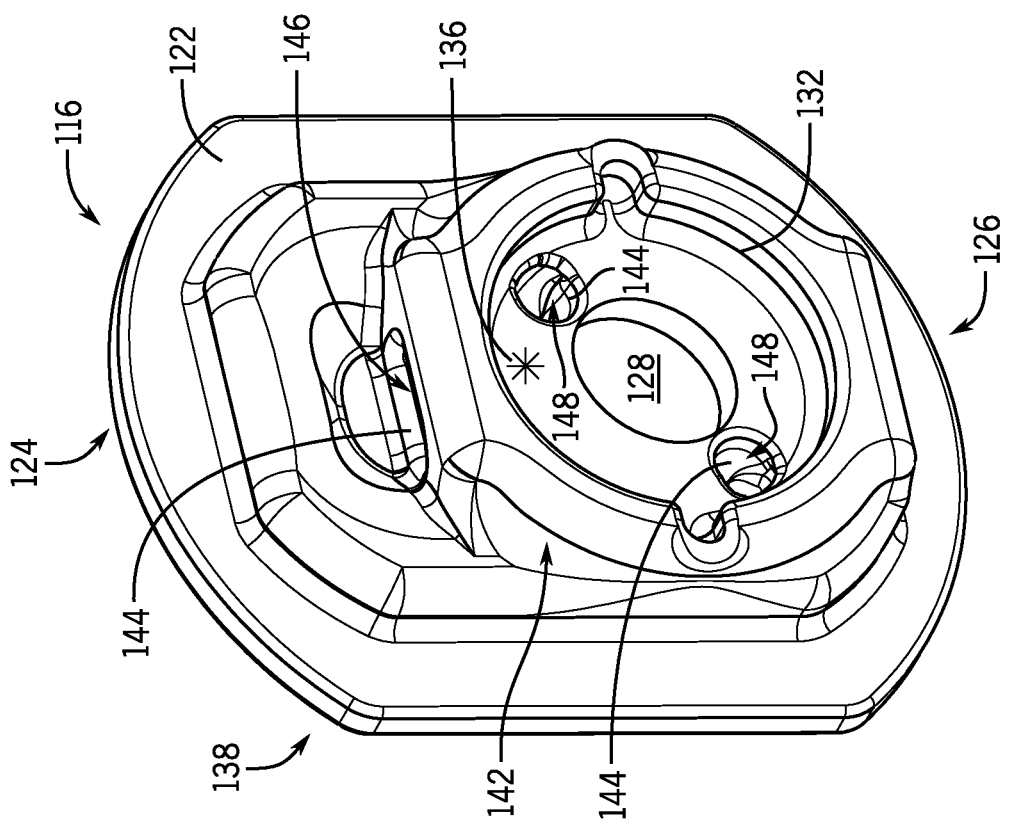

ADJUSTABLE DROP TRANSMISSION ASSEMBLY FOR A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to transmission assemblies for the operation of work vehicles for agricultural, forestry, construction, and other work applications.

BACKGROUND OF THE DISCLOSURE

Work vehicles come in a variety of platform configurations according to which a structural arrangement of components thereon may differ. One example of such a structural arrangement of components is the drop height between the engine and the axle of the work vehicle, with this drop height varying based on the specific configuration of the work vehicle. Another example is the drop height between the engine and a hydraulic pump of the work vehicle, with this drop height varying based on a necessary clearance of the hydraulic pump to the vehicle frame. In each case, a distinct work vehicle form will typically require a different transmission and associated transmission housing to accommodate the difference in drop heights, as gear centers and angles of engagements between gears will need to change to accommodate the change in vertical drop height. This requirement for a different transmission and associated housing for each distinct work vehicle form can, undesirably, increase production costs and complexity in the production process.

SUMMARY OF THE DISCLOSURE

In one aspect, the disclosure provides a transmission assembly for a work vehicle having a prime mover. The transmission assembly includes a housing configured to accommodate a first transmission shaft and a second transmission shaft, a gear arrangement positioned in the housing and configured to provide a selective gear reduction for transmission of power between the first and second transmission shafts, and a quill structure secured to the housing and that supports the first transmission shaft therein. The quill structure is couplable to the housing in a first orientation and a second orientation to vary a vertical spacing between the first transmission shaft and the second transmission shaft, with the quill structure defining a bearing bore that receives the first transmission shaft therein and provides for rotation of the first transmission shaft relative to the quill structure, the bearing bore formed at a location vertically offset from a vertical center point of the quill structure. With the quill structure coupled to the housing in the first orientation, the vertical spacing between the first transmission shaft and the second transmission shaft is a first vertical distance. With the quill structure coupled to the housing in the second orientation, the vertical spacing between the first transmission shaft and the second transmission shaft is a second vertical distance.

In one implementation, the first transmission shaft is an input shaft driven by the prime mover of the work vehicle and the second transmission shaft is an output shaft coupled to an axle of the work vehicle.

In one implementation, the gear arrangement includes an input gear coupled to the input shaft and mating gears positioned to mesh with the input gear and be driven by the input gear. The input gear meshes with the mating gears at a first mesh point with the quill structure coupled to the housing in the first orientation and meshes with the mating gears at a second mesh point with the quill structure coupled to the housing in the second orientation.

In one implementation, the first mesh point is a first gear position above a center line of the mating gears and the second mesh point is a second gear position below the center line of the mating gears, the first gear position and the second gear position vertically equidistant from the center line.

In one implementation, center lines of the mating gears and a center line of the input gear form an equilateral triangle at each of the first mesh point and the second mesh point.

In one implementation, the transmission assembly includes a first electric machine coupled to the input shaft to receive power therefrom, the first electric machine configured to generate an output electrical power responsive to being driven by the input shaft. The transmission assembly also includes a second electric machine that receives the output electrical power from the first electric machine. The gear arrangement is operably connected to the second electric machine and configured to provide a selective gear reduction for transmission of output power from the second electric machine to the output shaft.

In one implementation, the second orientation is offset 180 degrees from the first orientation.

In one implementation, the quill structure includes a front quill and a rear quill, each of the front quill and the rear quill including a quill body having a first end and a second end, with the bearing bore formed in the quill body at a location vertically offset from a vertical center point of the quill body.

In one implementation, the quill body includes a lube reservoir and lube passages formed therein configured to deliver lubricant to a shaft bearing positioned in the bearing bore, with lubricant delivered to the shaft bearing with the quill body oriented in either the first orientation or the second orientation.

In one implementation, the quill body is an oblong body having the first and second ends.

In another implementation, the second transmission shaft is an input shaft driven by the prime mover of the work vehicle and the first transmission shaft is an output shaft coupled to a hydraulic pump in the work vehicle.

In another aspect, a work vehicle includes a prime mover and a transmission assembly operably connected to the prime mover for transmission of power between a first transmission shaft and a second transmission shaft. The transmission assembly further includes a housing, a gear arrangement positioned in the housing and configured to provide a selective gear reduction for transmission of power between the first and second transmission shafts, and a quill structure secured to the housing and configured to support the first transmission shaft within a bearing bore formed in the quill structure that is eccentric from a vertical center point of the quill structure, the quill structure providing for rotation of the first transmission shaft. The quill structure is couplable to the housing in a first orientation and a second orientation to vary a vertical spacing between the first transmission shaft and the second transmission shaft such that the vertical spacing between the first transmission shaft and the second transmission shaft is a first vertical distance when the quill structure is coupled to the housing in the first orientation and the vertical spacing between the first transmission shaft and the second transmission shaft is a second vertical distance when the quill structure is coupled to the housing in the second orientation.

In one implementation, the quill structure includes a front quill and a rear quill, each of the front quill and the rear quill comprising an oblong quill body having a first end and a second end, with the bearing bore formed in the oblong quill body closer to the second end than the first end.

In one implementation, the oblong quill body includes a lube reservoir and lube passages formed therein configured to deliver lubricant to a shaft bearing positioned in the bearing bore, with lubricant delivered to the shaft bearing with the oblong quill body oriented in either the first orientation or the second orientation.

In one implementation, the first transmission shaft is an input shaft driven by the prime mover of the work vehicle and the second transmission shaft is an output shaft coupled to an axle of the work vehicle.

In one implementation, the gear arrangement includes an input gear coupled to the input shaft and mating gears positioned to mesh with the input gear and be driven by the input gear.

In one implementation, the input gear meshes with the mating gears at a first mesh point with the quill structure coupled to the housing in the first orientation and meshes with the mating gears at a second mesh point with the quill structure coupled to the housing in the second orientation.

In one implementation, the first mesh point is a first gear position above a center line of the mating gears and the second mesh point is a second gear position below the center line of the mating gears, the first gear position and the second gear position vertically equidistant from the center line.

In another implementation, the second transmission shaft is an input shaft driven by the prime mover of the work vehicle and the first transmission shaft is an output shaft coupled to a hydraulic pump in the work vehicle.

In one implementation, the second orientation is offset 180 degrees from the first orientation.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 4A is a perspective view of a front quill included in the transmission assembly of FIG. 2, arranged for coupling to the housing in a first orientation;

FIG. 4B is a perspective view of a front quill included in the transmission assembly of FIG. 2, arranged for coupling to the housing in a second orientation;

Figure 1:
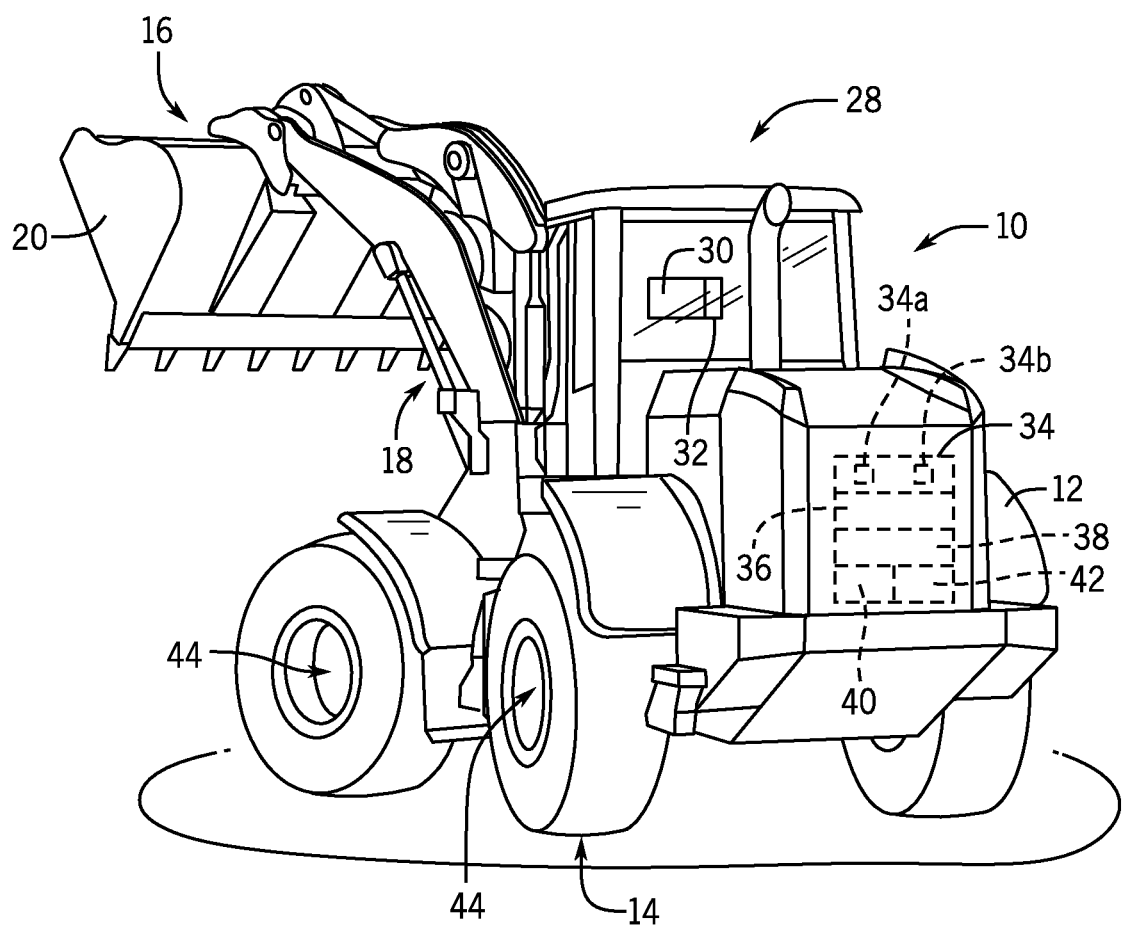
FIG. 1 illustrates an example work vehicle incorporating a transmission assembly that accommodates multiple transmission drop heights, in accordance with an embodiment.

Like reference symbols in the various drawings indicate like elements. For simplicity and clarity of illustration, descriptions and details of well-known features and techniques may be omitted to avoid unnecessarily obscuring the example and non-limiting embodiments described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

OVERVIEW

As previously noted, various types of work vehicle platforms, such as loaders and tractors as examples, have differing structural arrangements of components, including differing drop heights between the engine and the axle of the work vehicle or differing drop heights between the engine and a hydraulic pump of the work vehicle. In each case, each distinct work vehicle form typically requires a different transmission and associated transmission housing to accommodate the difference in drop heights, as gear centers and angles of engagements between gears will need to change to accommodate the change in vertical drop height.

It is recognized that this requirement for a different transmission and housing for each distinct work vehicle form can, undesirably, increase production costs and complexity in the production process. To simplify the production process and reduce the production costs associated therewith, an adjustable drop transmission assembly for a work vehicle is provided that accommodates various work vehicle forms and their associated differences in drop heights. The adjustable drop transmission assembly includes a quill structure mountable to the transmission housing that may be reoriented to adjust the height between the input shaft and output shaft tied into the transmission assembly. By providing this adjustability of the vertical distance between the input shaft and output shaft, the quill structure allows the use of a common transmission across various work vehicle forms.

In one embodiment, the first transmission shaft is an input shaft driven by the prime mover of the work vehicle and the second transmission shaft is an output shaft coupled to an axle of the work vehicle. In another embodiment, the first transmission shaft is an output shaft coupled to a hydraulic pump in the work vehicle and the second transmission shaft is an input shaft driven by the prime mover of the work vehicle.

In an embodiment where the first transmission shaft is an input shaft and the second transmission shaft is an output shaft, an implementation of the gear arrangement may include an input gear coupled to the input shaft and mating gears positioned to mesh with the input gear and be driven by the input gear. The input gear meshes with the mating gears at a first mesh point with the quill structure coupled to the housing in the first orientation and meshes with the mating gears at a second mesh point with the quill structure coupled to the housing in the second orientation. The first mesh point is a first gear position above a center line of the mating gears and the second mesh point is a second gear position below the center line of the mating gears, the first gear position and the second gear position vertically equidistant from the center line.

In an embodiment, the quill structure includes a front quill and a rear quill, each of the front quill and the rear quill including an oblong quill body having a first end and a second end, with the bearing bore formed in the quill body at a location vertically offset from a vertical center point of the quill body. The quill body may include a lube reservoir and lube passages formed therein configured to deliver lubricant to a shaft bearing positioned in the bearing bore, with lubricant delivered to the shaft bearing with the quill body oriented in either the first orientation or the second orientation.

Example embodiments of a work vehicle having an adjustable drop transmission assembly are provided in FIGS. 1-10 according to this disclosure. The following examples notwithstanding, other types of work vehicles and other configurations of transmission assemblies would also benefit from inclusion of a quill structure as described hereafter. It is therefore recognized that aspects of the invention are not meant to be limited only to the specific embodiments described hereafter.

EXAMPLE EMBODIMENTS OF AN ADJUSTABLE DROP TRANSMISSION ASSEMBLY

Referring initially to FIG. 1, a work vehicle 10 is shown that can implement details of one or more embodiments. In the illustrated example, the work vehicle 10 is depicted as a wheeled loader. It will be understood, however, that other configurations may be possible, including configurations with the work vehicle 10 as a mining machine, tractor, a harvester, a log skidder, or one of various other work vehicle types.

The work vehicle 10 includes a chassis 12 and a ground engaging mechanism or ground drive element 14. The ground engaging mechanism 14 is capable of supporting the chassis 12 and propelling the chassis 12 across the ground. Although the illustrated work vehicle 10 includes wheels as ground engaging mechanism 14, the work vehicle 10 may include other ground engaging mechanisms, such as steel tracks, rubber tracks, or other suitable ground engaging members.

The work vehicle 10 further includes a loader assembly 16 having a loader boom 18 and a work tool 20 in the form of a bucket. The work tool 20 may be capable of moving, excavating, plowing, or performing other material handling functions on a load, such as dirt or other materials. Other suitable work tools include, for example, blades, pallet forks, bale lifts, augers, harvesters, tillers, mowers, and grapples. The loader boom 18 is configured to move relative to the chassis 12 to move and operate the work tool 20.

An operator or autonomous control may operate the work vehicle 10, including the ground engaging wheels 14 and the loader assembly 16, from an operator station 28 in the work vehicle 10. While not shown in FIG. 1, it is recognized that the operator station 28 may include a human-vehicle interface 30 and various controls therein configured to receive input commands from the operator to control, for example, various electric or hydraulic systems associated with actuating and controlling the loader assembly 16. The human-vehicle interface 30 may be configured in a variety of ways and may include input devices 32 that may include one or more joysticks, various switches or levers, one or more buttons, a touchscreen interface that may be overlaid on a display, a keyboard, a speaker, a microphone associated with a speech recognition system, or various other human-machine interface devices.

The work vehicle 10 includes a controller 34 (or multiple controllers) to control various aspects of the operation of the work vehicle 10. Generally, the controller 34 may be configured as a computing device with associated processor devices 34a and memory architectures 34b, as a hard-wired computing circuit (or circuits), as a programmable circuit, as a hydraulic, electrical, or electro-hydraulic controller, or otherwise. As such, the controller 34 may be configured to execute various computational and control functionality with respect to the work vehicle 10. In some embodiments, the controller 34 may be configured to receive input signals in various formats (e.g., as hydraulic signals, voltage signals, current signals, etc.), and to output command signals in various formats (e.g., as hydraulic signals, voltage signals, current signals, mechanical movements, etc.). In one embodiment, the controller 34 may be configured to receive input commands and to interface with the operator via the human-vehicle interface 30.

The controller 34 may be in electronic, hydraulic, mechanical, or other communication with various other systems or devices of the work vehicle 10. For example, the controller 34 may be in electronic or hydraulic communication with various actuators, sensors, and other devices within (or outside of) the work vehicle 10, including various devices described below. The controller 34 may communicate with other systems or devices (including other controllers) in various known ways, including via a CAN bus (not shown) of the work vehicle 10, via wireless or hydraulic communication means, or otherwise. An example location for the controller 34 is depicted in FIG. 1; however, it is understood that other locations on the work vehicle 10 are possible.

The controller 34 may facilitate the input of various types of operator commands and collection of various types of vehicle operating parameter data associated with the work vehicle 10 for providing transmission shifting in the work vehicle 10. As indicated above, operator commands may be input to the controller 34 via the human-vehicle interface 30, while the vehicle operational parameter data may be in the form of raw data from the applicable sensors described below (or other sources) or undergo some processing in the controller 34 to extract the desired characteristics. Inputs and data received by the controller 34 are utilized to shifting between different transmission modes in the work vehicle 10 via operation and control of a transmission 36 included in the work vehicle 10, on which further details will be provided below.

The work vehicle 10 includes a source of propulsion that, in an example embodiment, is provided as a hybrid electric drive system that includes a prime mover 38, such as an engine (hereafter "engine 38"), and a plurality of electrical machines 40, 42. The engine 38 and the electrical machines 40, 42 may supply power to the transmission 36.

In one example, the engine 38 is an internal combustion engine, such as a diesel engine, that is controlled by the controller 34 to enable start-up of the engine 38, enable shutdown of the engine 38, disable operation of the engine 38, and/or to modify some aspect of operation of the engine 38 or associated system, for example, based on input received from the human-vehicle interface 30.

In one example, the electrical machines 40, 42 are AC motors, such as permanent magnet AC motors or induction motors. In one implementation, and as will be explained in greater detail in FIGS. 2 and 3, a first electrical machine 40 may receive mechanical power from the engine 38 and convert this power to electrical power, with electrical power from the first electrical machine 40 then being provided to the second electrical machine 42. This electrical power may then be re-converted by the second electrical machine 42 for mechanical output. The electrical machines 40, 42 may be controlled by the controller 34 to control a speed and operational mode thereof, with the first electrical machine 40 operable in a "regenerative mode" to convert mechanical energy into electric energy and the second electrical machine 42 operable in a "motoring mode" to convert electrical energy into mechanical energy.

The transmission 36 transfers power from the second electrical machine 42 to an axle or axles 44 and driveline coupled to the ground engaging mechanism 14 of the work vehicle 10, which may include front and rear wheels, to enable the work vehicle 10 to move. As described in greater detail below when referring to FIGS. 2 and 3, the transmission 36 may operate as part of a series electric transmission assembly that charges the first electrical machine 40 through the engine 38 and then provides electrical power from the first electrical machine 40 to the second electrical machine 42, which provides a final power delivery through transmission 36 to an output (e.g., to a vehicle axle), on which further details will be provided below.

Figure 2:
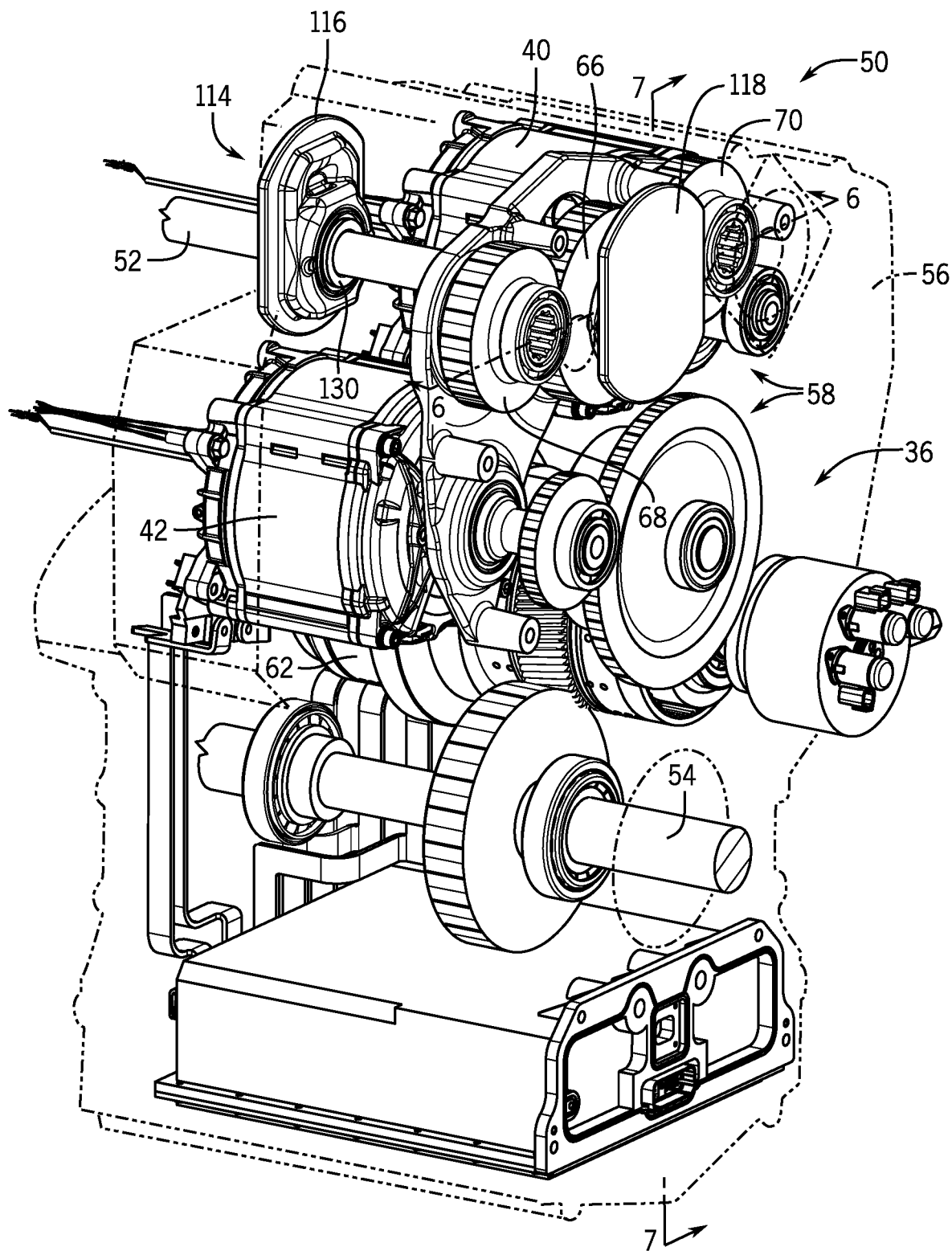
FIG. 2 is a perspective view of an example transmission assembly included in the work vehicle of FIG. 1, in accordance with an embodiment.
Figure 3:
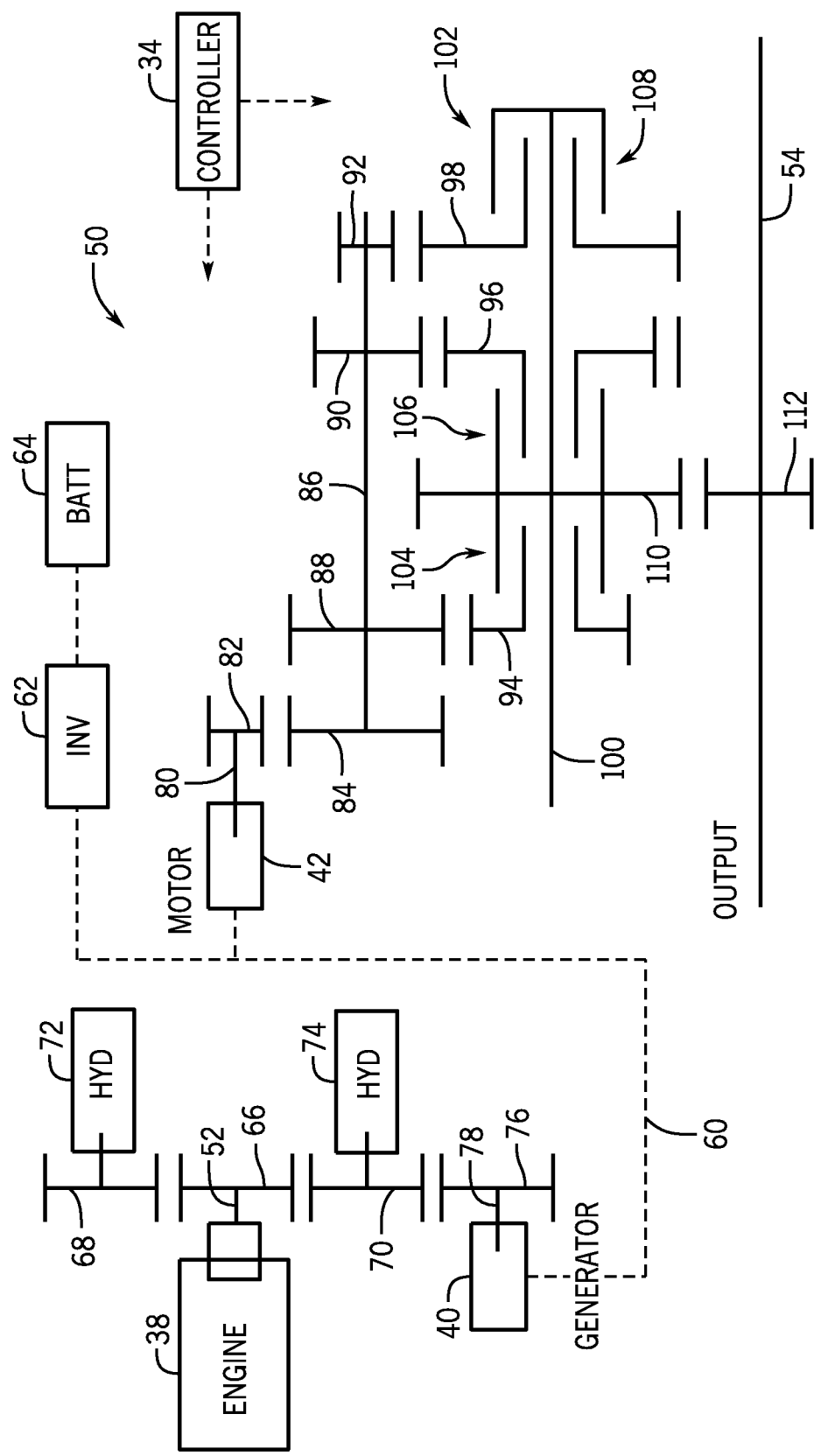
FIG. 3 is a schematic diagram of the transmission assembly of FIG. 2, in accordance with an embodiment.

Referring to FIGS. 2 and 3, an example of a transmission assembly 50 included in the work vehicle 10 is illustrated that provides a more detailed discussion of the structure thereof. Via control of the transmission assembly 50, and transmission 36 therein, power is transferred from an input shaft 52 that is driven by the engine 38 to an output shaft 54 that, in one embodiment, may be configured to transmit this received power to an axle 44 (FIG. 1) and onto the ground engaging mechanism 14 of the work vehicle 10. As described below, the transmission 36 includes a number of gearing, clutch, and control assemblies to suitably drive the output shaft 54 at different speeds and in multiple directions. In the example illustrated in FIGS. 2 and 3, the transmission assembly 50 is an electric series transmission arrangement where power from the second electrical machine 42 may be transmitted to the output shaft 54, with power from the engine 38 being used to charge the first electrical machine 40 (that, in turn, provides power to the second electrical machine 42). However, it recognized that alternatives to the transmission assembly 50 illustrated in FIGS. 2 and 3 may be utilized in connection with aspects of the disclosure. That is, it is recognized that the transmission assembly 50 illustrated in FIGS. 2 and 3 and described here below is merely an example and that transmission assemblies having different arrangements or constructions could instead incorporate details of this disclosure, including various hybrid, electric, and non-electric transmission assembly configurations.

As shown best in FIG. 2, the transmission assembly 50 includes a housing 56 that encloses the primary components of the transmission assembly 50, including the electrical machines 40, 42 and the gear arrangement (generally indicated as 58), clutch, and control assemblies of the transmission 36 that are described further below. The housing 56 is configured to provide for entry and exit of the input shaft 52 and output shaft 54 into and out from the interior volume of the housing, with openings formed in the housing 56 to accommodate routing of the shafts 52, 54.

In the illustrated embodiment of FIGS. 2 and 3, the transmission assembly 50 includes the transmission 36, the first electrical machine 40, and the second electrical machine 42. The first electrical machine 40 and second electrical machine 42 may be connected by an electrical conduit 60. A power inverter 62 may be included and may be operably connected to the first electrical machine 40 and/or the second electrical machine 42. In some embodiments, the power inverter 62 may feed energy to and/or receive energy from a battery assembly 64 (FIG. 2). Also, the power inverter 62 may feed energy to and/or receive energy from the transmission assembly 50. Moreover, in some embodiments, the power inverter 62 may off-board power to an implement and/or another energy off-boarding device (not shown).

The engine 38 may provide rotational power via an engine output element, such as a flywheel, to the input shaft 52 according to commands from the controller 34 based on the desired operation. The input shaft 52 may be configured to provide rotational power to an input gear 66. The input gear 66 may be enmeshed with mating gears 68, 70, which in one embodiment may be pump gears that transfer rotational power to pumps 72, 74 (e.g., hydraulic pumps, FIG. 3) operably connected to the transmission assembly 50.

One of the mating gears 70 is enmeshed with a gear 76 that is supported on (e.g., fixed to) a shaft 78. The shaft 78 may be substantially parallel to and spaced apart from the input shaft 52, and the shaft 78 may be connected to the first electrical machine 40. Accordingly, mechanical power from the engine (i.e., engine power) may transfer via the input shaft 52, to the enmeshed gears 66, 70, 76, to the shaft 78, and to the first electrical machine 40. The first electrical machine 40 may convert this power to electrical power for transmission over the conduit 60 to the second electrical machine 42. This converted and transmitted power may then be re-converted by the second electrical machine 42.

The second electrical machine 42 operates to convert electrical power for mechanical output along a shaft 80. The shaft 80 may support a gear 82 that is enmeshed with, and may transfer power to, a gear 84 for transmission to other components, as will be discussed in more detail below. The gear 84 is mounted (e.g., fixed) on a shaft 86 that also supports gears 88, 90, 92. The gears 88, 90, 92 are enmeshed with gears 94, 96, 98, respectively, that are fixed to a shaft 100 that may be substantially parallel to and spaced apart from the shaft 86.

The transmission assembly 50 may have one or more forward modes for moving the work vehicle 10 in a forward direction and one or more reverse modes for moving the work vehicle 10 in a reverse direction. That is, according to embodiments, the transmission assembly 50 may provide for different speed modes for each of the forward mode and the reverse mode. In the example embodiment, three (3) speeds are provided for each of the forward mode and the reverse mode, as will be explained in further detail below.

The transmission assembly 50 may switch between the forward mode and the reverse mode via selective control of the second electrical machine 42. That is, the direction of rotation of the second electrical machine 42 may be selectively controlled, such as via controller 34, in order to provide for a forward direction of movement or a reverse direction of movement. In each of the forward mode and the reverse mode, the transmission assembly 50 may switch between different speeds using a control assembly 102. The control assembly 102 may include one or more selectable transmission components. The selectable transmission components may have first positions (engaged positions), in which the respective device transmits power from an input component to an output component. The selectable transmission components may also have a second position (a disengaged position), in which the device prevents power transmission from the input to the output component. The selectable transmission components of the control assembly 102 may include one or more wet clutches, dry clutches, dog collar clutches, brakes, synchronizers, or other similar devices, with clutches being shown in FIG. 3. The control assembly 102 may also include an actuator for actuating the selectable transmission components between the first and second positions.

As shown in FIG. 3, the control assembly 102 may include a first clutch 104, a second clutch 106, and a third clutch 108. In some embodiments, the first clutch 104, second clutch 106, and third clutch 108, along with gears 94, 96, 98, may be mounted and supported on the shaft 100. Also fixed to the shaft 100 is a gear 110, and the gear 110 may be enmeshed with a gear 112 that is fixed to the output shaft 54.

The first clutch 104, in an engaged position, may engage the gear 94 with the shaft 100 for rotation as a unit. The first clutch 104, in a disengaged position, may allow the gear 94 to rotate relative to the shaft 100. Similarly, the second clutch 106, in an engaged position, may engage the gear 96 with the shaft 100 for rotation as a unit. The second clutch 106, in a disengaged position, may allow the gear 96 to rotate relative to the shaft 100. Finally, the third clutch 108, in an engaged position, may engage the gear 98 with the shaft 100 for rotation as a unit. The third clutch 108, in a disengaged position, may allow the gear 98 to rotate relative to the shaft 100.

As indicated previously, the transmission assembly 50 is operable in a number of modes based on selective operation of the second electrical machine 42 and the transmission 36, including a number of different speed modes for each of the forward mode and the reverse mode. As introduced above, the controller 34 is coupled to the control assembly 102 for controlling one or more actuators and, as a result, controlling movement of the one or more selective transmission components within the transmission 36, including the first clutch 104, the second clutch 106, and the third clutch 108. Generally, the controller 34 operates the control assembly 102, as well as the engine 38 and second electrical machine 42, to implement the desired function, e.g., to achieve the requested torque at the output shaft 54 for overall control of the work vehicle 10. This includes vehicle accelerations, stops, starts, shifting between gear ratios, shifting between directions, and the like.

For operating the transmission assembly 50 in a first speed mode, the controller operates the control assembly 102 such that the first clutch 104 is operated in the engaged position, while the second clutch 106 and the third clutch 108 are operated in the disengaged position. According to this operation of the control assembly 102, power is transferred from the second electrical machine 42, through the enmeshed gears 82, 84 to shaft 86, through the enmeshed gears 88, 94 and engaged first clutch 104 to shaft 100, and through enmeshed gears 110, 112 to the output shaft 54. Output speed and torque is thus provided to the output shaft 54 according to the parameters of the first speed mode of operation.

For operating the transmission assembly 50 in a second speed mode, the controller 34 operates the control assembly 102 such that the second clutch 106 is operated in the engaged position, while the first clutch 104 and the third clutch 108 are operated in the disengaged position. According to this operation of the control assembly 102, power is transferred from the second electrical machine 42, through the enmeshed gears 82, 84 to shaft 86, through the enmeshed gears 90, 96 and engaged second clutch 106 to shaft 100, and through enmeshed gears 110, 112 to the output shaft 54. Output speed and torque is thus provided to the output shaft 54 according to the parameters of the second speed mode of operation.

For operating the transmission assembly 50 in a third speed mode, the controller 34 operates the control assembly 102 such that the third clutch 108 is operated in the engaged position, while the first clutch 104 and second clutch 106 are operated in the disengaged position. According to this operation of the control assembly 102, power is transferred from the second electrical machine 42, through the enmeshed gears 82, 84 to shaft 86, through the enmeshed gears 92, 98 and engaged third clutch 108 to shaft 100, and through enmeshed gears 110, 112 to the output shaft 54. Output speed and torque is thus provided to the output shaft 54 according to the parameters of the third speed mode of operation.

According to embodiments, it is recognized that a drop height between the engine 38 and the axle 44 of the work vehicle 10 may vary based on the form of the work vehicle 10, and that this drop height corresponds to a spacing of the input shaft 52 and output shaft 54 of the transmission assembly 50. In order to accommodate varying drop heights between different work vehicle forms while using a common transmission assembly 50 (i.e., without having to use a distinct transmission assembly for each work vehicle form), the transmission assembly 50 includes therein a quill structure 114 that provides for an adjustment of the drop height between the input shaft 52 and output shaft 54, without the need for changing the housing 56 and/or gear arrangement 58 to accommodate distinct drop heights.

Figure 6:
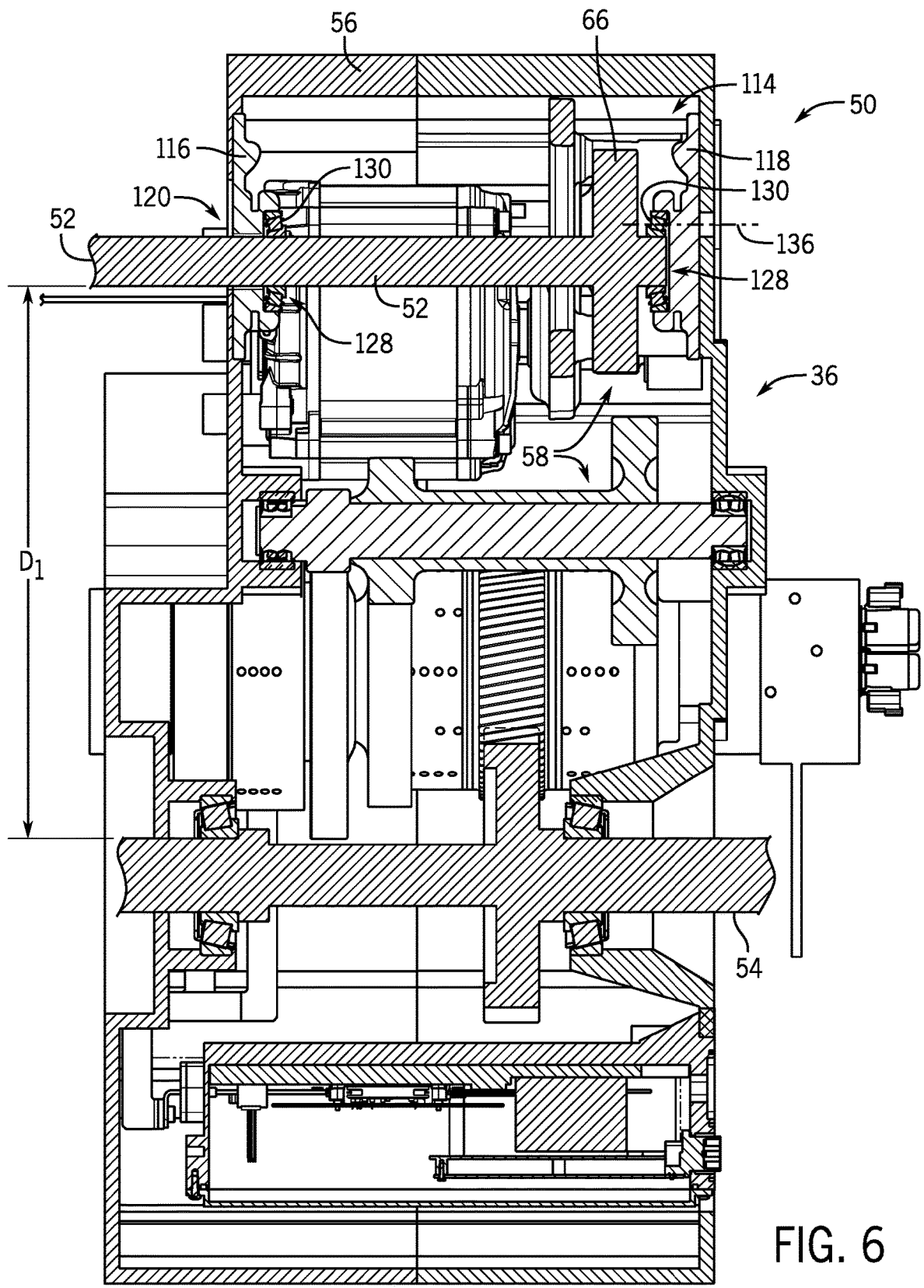
FIG. 6 is a cross-sectional view of the transmission assembly of FIG. 2 taken along line 7-7, with the quill structure mounted in the first orientation to provide a first vertical spacing between the input shaft and the output shaft of the transmission assembly.
Figure 8:
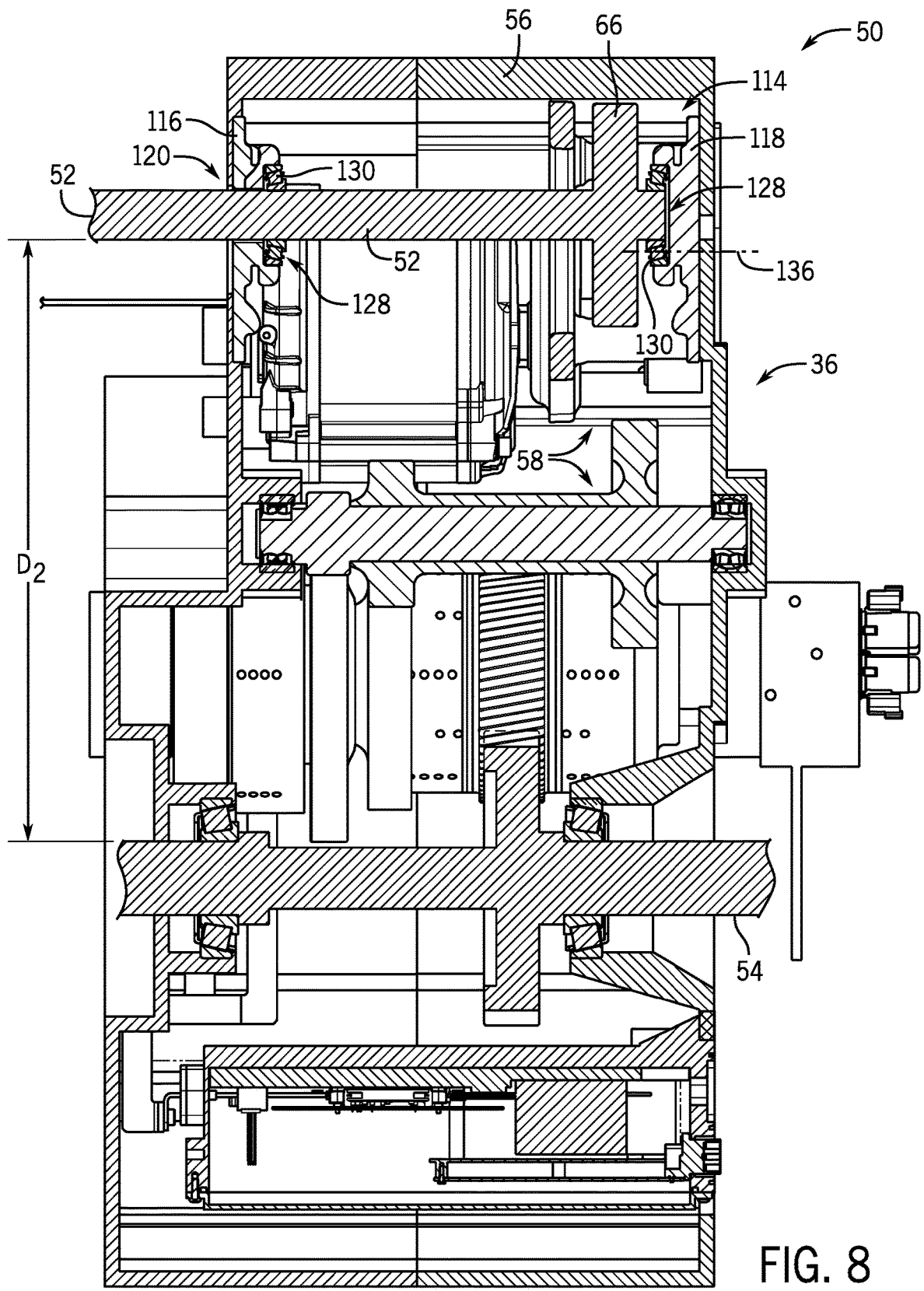
FIG. 8 is a cross-sectional view of the transmission assembly of FIG. 2 taken along line 7-7, with the quill structure mounted in the second orientation to provide a second vertical spacing between the input shaft and the output shaft of the transmission assembly.

As best seen in FIG. 2 and now also in FIGS. 6 and 8, a quill structure 114 is included in the transmission assembly 50 that is mountable to the housing 56, with the quill structure 114 configured to retain the input shaft 52 in position. The quill structure 114 may include a front quill 116 and a rear quill 118 that are secured to opposing sides of the housing 56, such as via fasteners or other attachment mechanisms. While the front and rear quills 116, 118 are shown as being secured to an interior surface of the housing 56 in the present embodiment, it is recognized that the front and rear quills 116, 118 may be secured to an exterior surface of the housing 56 in other embodiments. The front quill 116 may be aligned with an opening 120 formed in the housing 56 to allow for the input shaft 52 to pass into the interior of the housing 56, as will be explained further below.

Figure 5B:
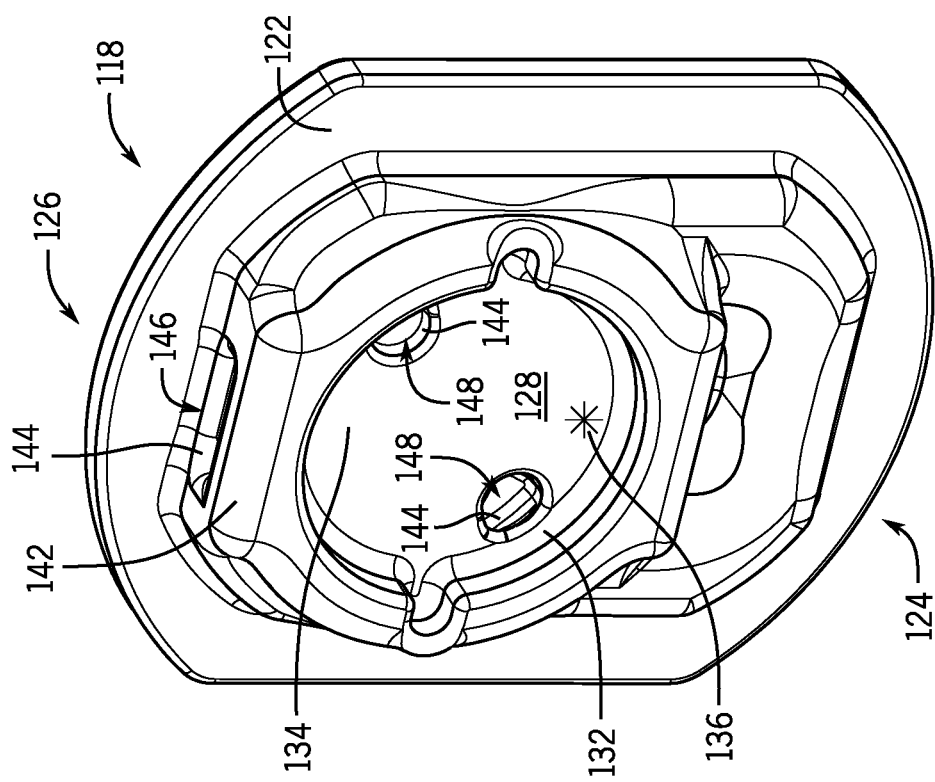
FIG. 5B is a perspective view of a rear quill included in the transmission assembly of FIG. 2, arranged for coupling to the housing in a second orientation.
Figure 5A:
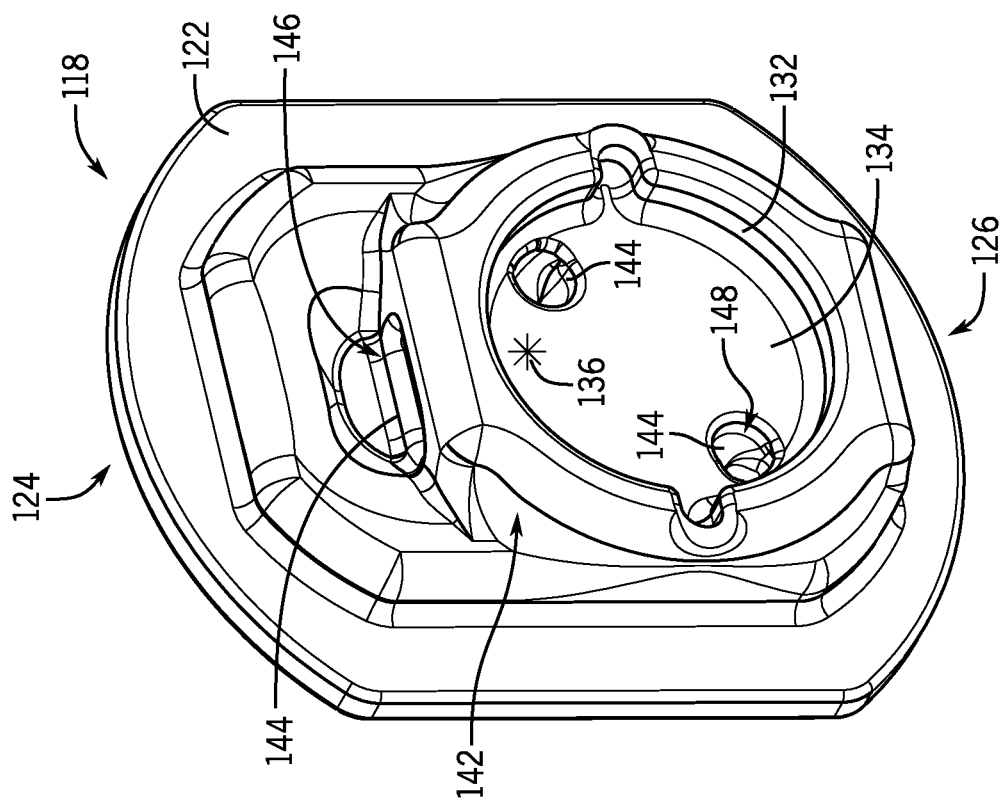
FIG. 5A is a perspective view of a rear quill included in the transmission assembly of FIG. 2, arranged for coupling to the housing in a first orientation.

FIGS. 4A and 4B and FIGS. 5A and 5B illustrate an example construction of the front and rear quills 116, 118, respectively. Each of the quills 116, 118 is generally formed of an oblong quill body 122 having a first end 124 and a second end 126. A bearing bore 128 is formed in the quill body 122 to accommodate therein the input shaft 52 and bearings 130 (FIG. 2) positioned about the input shaft 52 and provide for rotation of the input shaft relative to the quill body 122, with a flanged seat 132 in the quill body 122 defining the bearing bore 128. As shown in FIGS. 4A and 4B, the bearing bore 128 in the front quill 116 extends entirely through the quill body 122 (i.e., forms an opening) so that the input shaft 52 may be routed therethrough and pass from the exterior of the housing 56 to the interior of the housing 56, with the flanged seat 132 defining the opening in the quill body 122. As shown in FIGS. 5A and 5B, the bearing bore 128 in the rear quill 118 formed by flanged seat 132 terminates at a surface 134 of the quill body 122 (i.e., does not extend through the quill body 122), with bearings 130 and an end of the input shaft 52 positioned in the bearing bore 128.

For each of the front and rear quills 116, 118, the bearing bore 128 is formed in the quill body 122 at a location that is vertically offset (i.e., eccentric) from a vertical center point 136 of the quill body 122. In the illustrated embodiment, the bearing bore 128 is offset from the vertical center point 136 so as to be positioned closer to the second end 126 than the first end 124, but it is recognized that the bearing bore 128 could instead be offset from the vertical center point 136 so as to be positioned closer to the first end 124 than the second end 126. In an embodiment, a centerline of the bearing bore 128 is positioned halfway between the vertical center point 136 of the quill body 122 and the second end 126 of the quill body 122.

According to embodiments, the front and rear quills 116, 118 may be secured to the housing 56 in either of a first orientation 138 (FIGS. 4A and 5A) or a second orientation 140 (FIGS. 4B and 5B), thereby varying the vertical position of the bearing bore 128, i.e., with the bearing bore 128 positioned vertically below the vertical center point 136 of the quill body 122 when in the first orientation 138 and positioned vertically above the vertical center point 136 of the quill body 122 when in the second orientation 140. Reorienting the front and rear quills 116, 118 between the first orientation 138 and the second orientation 140 provides a corresponding adjustment of the vertical position of the input shaft 52 relative to the transmission 36 (i.e., gear assembly 58) and the output shaft 54. Adjustment of the vertical position of the input shaft 52 accommodates varying drop heights between the input shaft 52 and output shaft 54 for different work vehicle forms while using a common transmission assembly 50.

In some embodiments, the quill body 122 includes a lube reservoir 142 and lube passages 144 formed therein configured to deliver lubricant to the bearings 130 positioned in the bearing bore 128. The lube reservoir 142 is formed in an interior of the quill body 122 and may be fluidly connected to a lube source (not shown) via an inlet 146 to receive lubricant therefrom, such as a lubricating oil for example. Lube passages 144 are formed within the quill body 122 to extend between the reservoir 142 and outlets 148 through which lubricant may be dispensed onto the bearings 130. According to embodiments, the outlets 148 may be formed in the quill body 122 at locations within the area defined by the flanged seat 132 at locations adjacent where the bearings 130 are seated in the bearing bore 128. The positioning of the lube reservoir 142, lube passages 144, inlets 146 and outlets 148 allows for lubricant to be delivered to the bearings 130 with the quill body 122 oriented in either the first orientation 138 or the second orientation 140, while preventing leaking of any lubricant.

Referring now to FIG. 6, a side view of the transmission assembly 50 is provided that shows positioning of the input shaft 52 relative to the transmission 36 (i.e., gearing, clutches, and control components) and the output shaft 54 with the quill structure 114 retaining the input shaft 52 in a first position. With the front and rear quills 116, 118 secured to the housing 56 in a first orientation 138, the input shaft 52 is retained within the bearing bores 128 at a position that is below the vertical center point 136 of the quill body 122. Accordingly, and as seen in FIG. 6, a vertical spacing between the input shaft 52 and the output shaft 54 is set at a first vertical distance D1. In one embodiment, the first vertical distance D1 may be a distance of 500 mm, to accommodate a corresponding drop height between the engine 38 and axle 44 for a particular work vehicle form.

Figure 7:
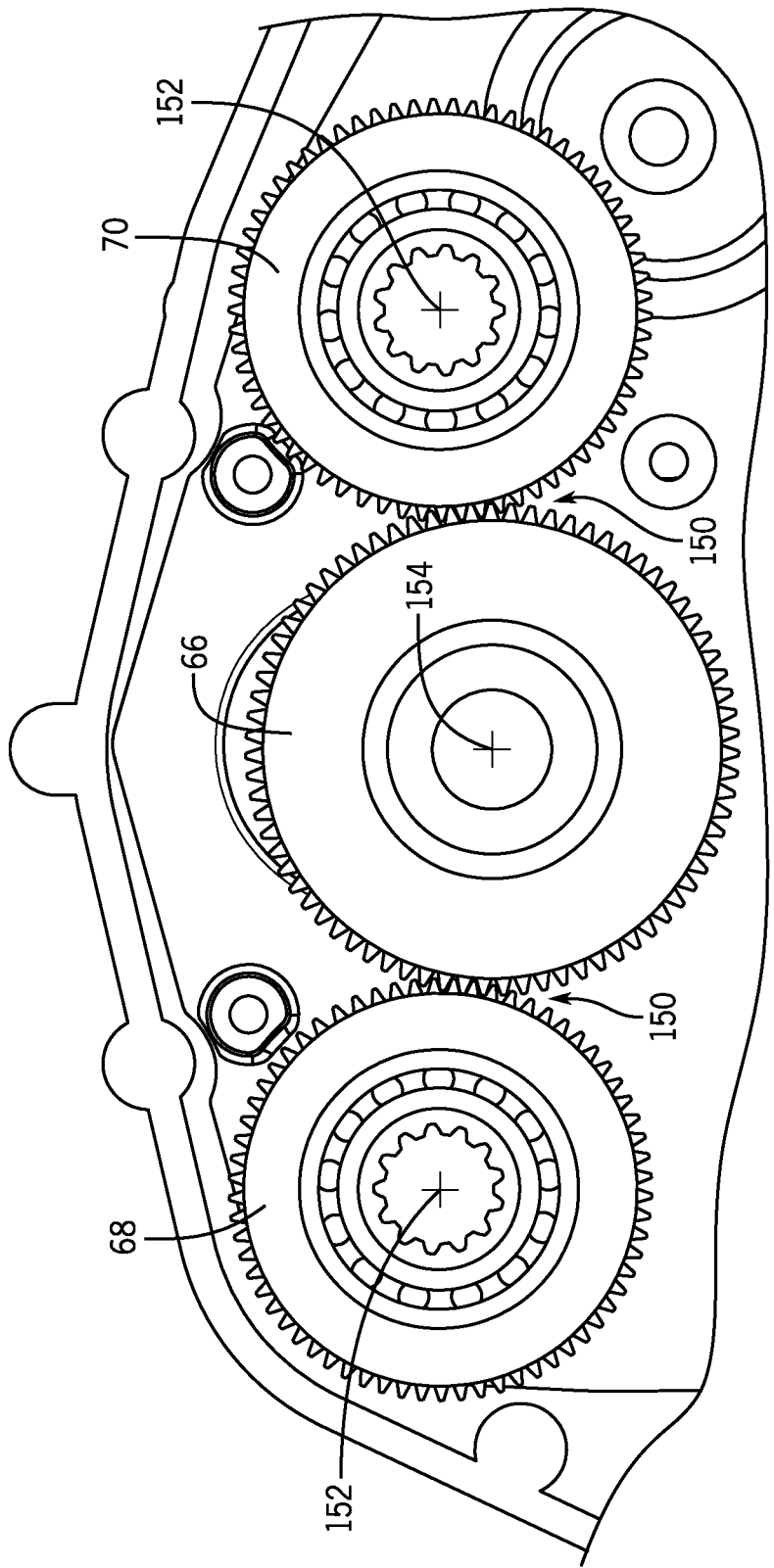
FIG. 7 illustrates mesh points between an input gear and mating gears of the transmission assembly of FIG. 6, with the quill structure mounted in the first orientation.

With the quills 116, 118 secured to the housing 56 in the first orientation 138 and the input shaft 52 thus retained within the bearing bores 128 at a position that is below the vertical center point 136 of the quill body 122, the input gear 66 is positioned to mesh with the mating gears 68, 70 of the transmission 36. The meshing of the input gear 66 with the mating gears 68, 70 with the quills 116, 118 secured to the housing 56 in the first orientation 138 is shown in FIG. 7. As seen in FIG. 7, the input gear 66 meshes with the mating gears 68, 70 at a first mesh point 150 that corresponds to a (first) gear position on the mating gears 68, 70 that is below a center line 152 thereof. In some embodiments, the first mesh point 150 may be at the 4 o'clock and 8 o'clock positions on the respective mating gears 68, 70, although it is recognized that the input gear 66 could mesh with the mating gears 68, 70 at other suitable mesh point angular positions. Also, in some embodiments, with the input gear 66 and the mating gears 68, 70 meshing at the first mesh point 150, the center lines 152 of the mating gears 68, 70 and the center line of the input gear 66 form an equilateral triangle, so as to properly distribute forces among the gears.

Referring now to FIG. 8, a side view of the transmission assembly 50 is provided that shows positioning of the input shaft 52 relative to the transmission 36 (i.e., gearing, clutches, and control components) and the output shaft 54 with the quill structure 114 retaining the input shaft 52 in a second position. With the quills 116, 118 secured to the housing 56 in a second orientation 140, the input shaft 52 is retained within the bearing bores 128 at a position that is above the vertical center point 136 of the quill body 122. Accordingly, and as seen in FIG. 8, a vertical spacing between the input shaft 52 and the output shaft 54 is set at a second vertical distance D2. In one embodiment, the second vertical distance D2 may be a distance of 560 mm, to accommodate a corresponding drop height between the engine 38 and axle 44 for a particular work vehicle form.

Figure 9:
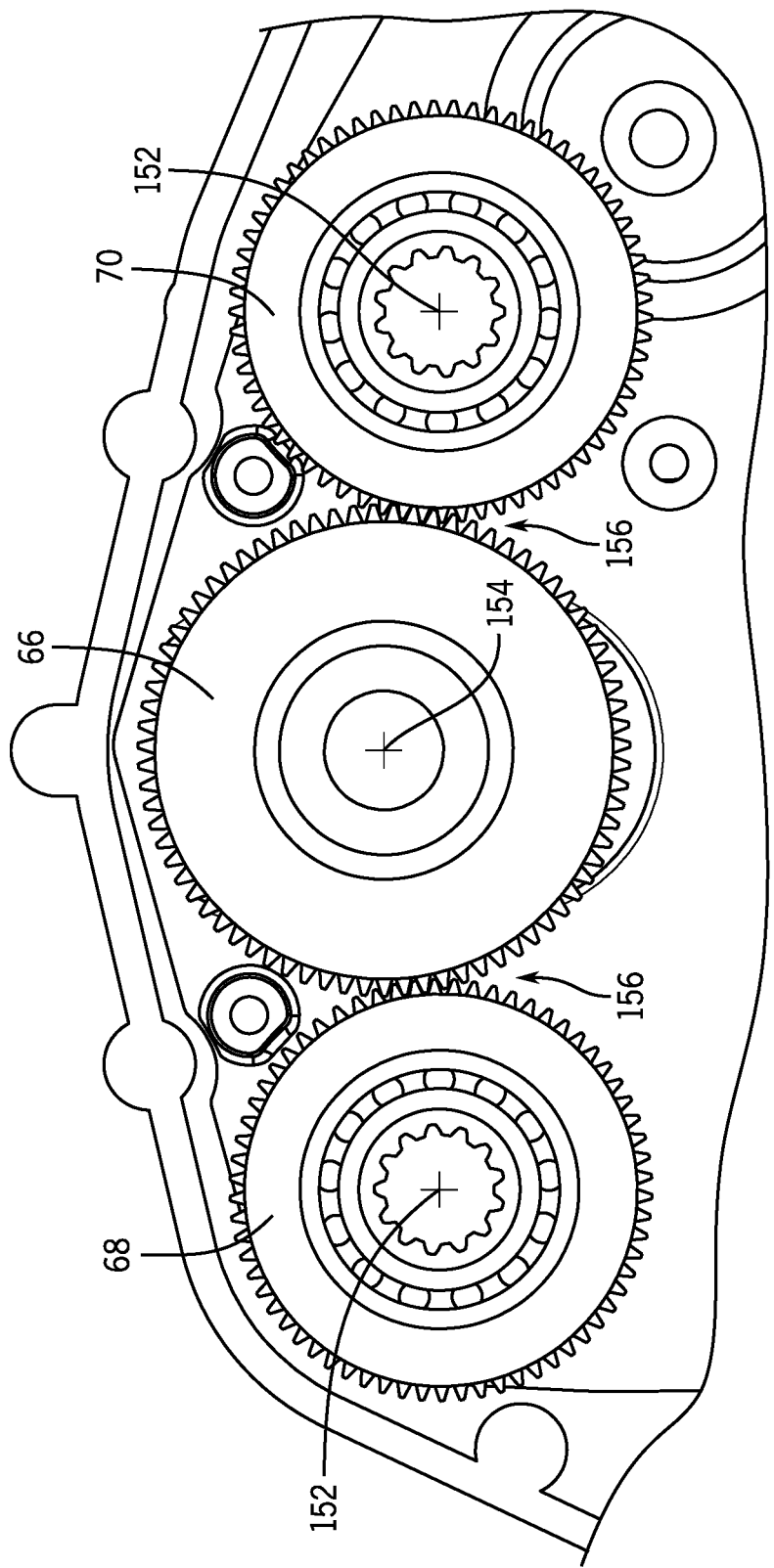
FIG. 9 illustrates mesh points between an input gear and mating gears of the transmission assembly of FIG. 8, with the quill structure mounted in the second orientation.

With the quills 116, 118 secured to the housing 56 in the second orientation 140 and the input shaft 52 thus retained within the bearing bores 128 at a position that is above the vertical center point 136 of the quill body 122, the input gear 66 is positioned to mesh with the mating gears 68, 70 of the transmission at a position that is shifted from that with the quills 116, 118 secured to the housing 56 in the first orientation 138. The meshing of the input gear 66 with the mating gears 68, 70 with the quills 116, 118 secured to the housing 56 in the second orientation 140 is shown in FIG. 9. As seen in FIG. 9, the input gear 66 meshes with the mating gears 68, 70 at a second mesh point 156 that corresponds to a (second) gear position on the mating gears 68, 70 that is above a center line 152 thereof. In some embodiments, the second mesh point 156 may be at the 2 o'clock and 10 o'clock positions on the respective mating gears 68, 70, although it is recognized that the input gear 66 could mesh with the mating gears 68, 70 at other suitable mesh point angular positions. Also, in some embodiments, with the input gear 66 and the mating gears 68, 70 meshing at the second mesh point 156, the center lines 152 of the mating gears 68, 70 and the center line 154 of the input gear 66 form an equilateral triangle, so as to properly distribute forces among the gears.

As described above and shown in FIGS. 7 and 9, the positioning of the input gear 66 relative to the mating gears 68, 70 with the quills 116, 118 of quill structure 114 in the first orientation 138 results in a first mesh point 150 corresponding to a gear position below a center line 152 of the mating gears 68, 70, while positioning of the input gear 66 relative to the mating gears 68, 70 with the quill structure 114 in the second orientation 140 results in a second mesh point 156 corresponding to a gear position above the center line 152 of the mating gears 68, 70. These first and second gear positions on the mating gears 68, 70 at which the input gear 66 meshes with the mating gears 68, 70—based on the orientation of the quill structure 114—are vertically equidistant from the center line 152 of the mating gears 68, 70. Accordingly, with the input gear 66 positioned at either location, the bearing loads and center distance between the input gear 66 and mating gears 68, 70 remains constant, such that operation of the transmission assembly 50 does not change regardless of the repositioning of the input shaft 52 and input gear 66, as determined by the orientation of the quill structure 114 as mounted to the housing 56.

While embodiments are shown and described in FIGS. 2-9 in connection with a transmission assembly 50 that transfers power from an input shaft 52 to an output shaft 54 that transmits power to an axle 44 of a work vehicle 10, it is recognized that other embodiments may be directed toward a transmission assembly that transfers power from an input shaft to an output shaft for operating a hydraulic pump. In such an implementation, it is recognized that a drop height between the engine of the work vehicle and a pump centerline of the hydraulic pump may require variation based on the form of the work vehicle and a related required clearance between the hydraulic pump and a frame of the vehicle.

Figure 10:
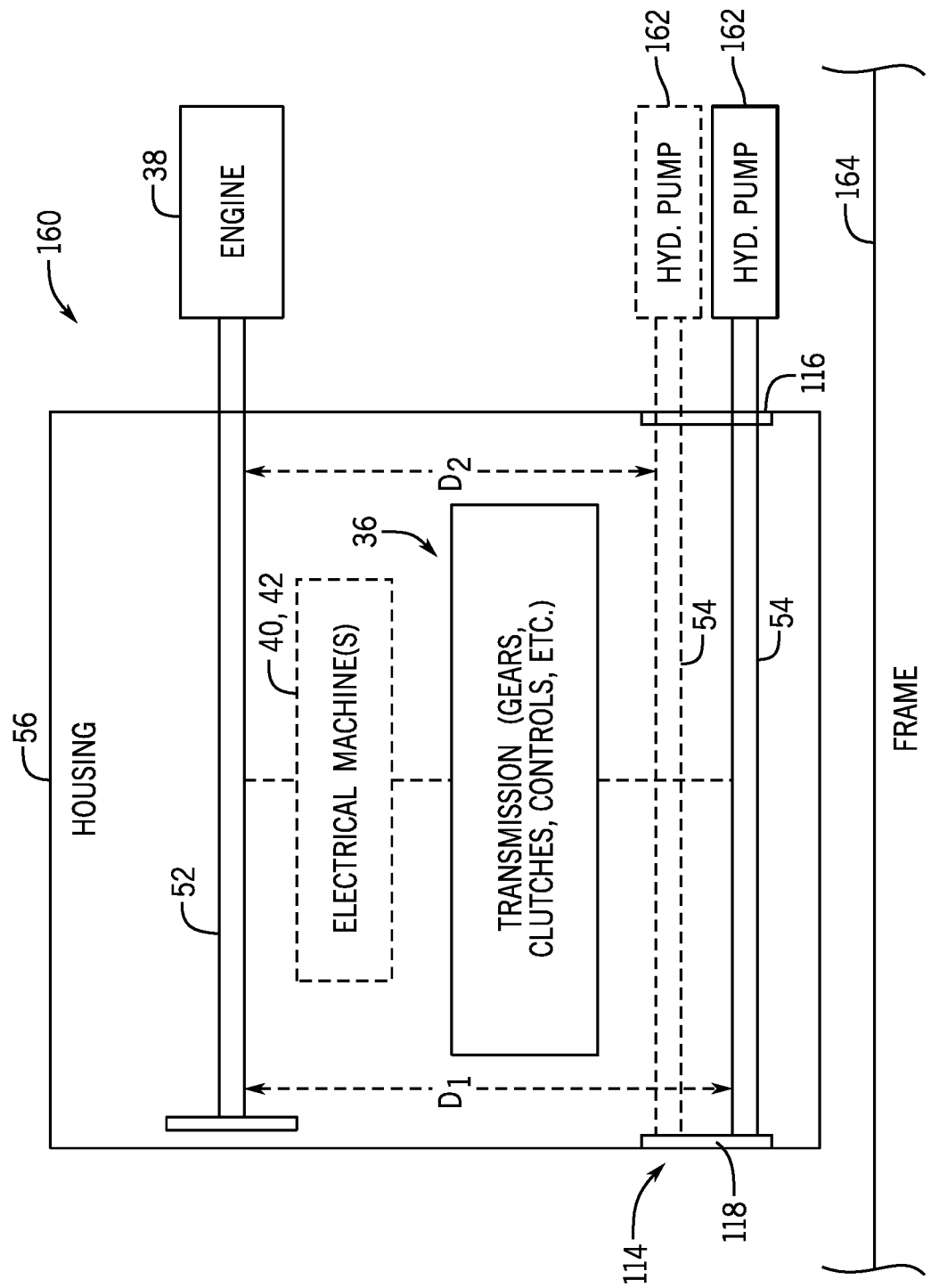
FIG. 10 is a block schematic diagram of an example transmission assembly included in the work vehicle of FIG. 1, in accordance with another embodiment.

Referring now to FIG. 10, a block schematic diagram of a transmission assembly 160 is provided in accordance with an implementation for driving a hydraulic pump 162. The transmission assembly 160 is an adjustable drop transmission assembly that is configured to vary a position of the output shaft 54 that drives the hydraulic pump 162, as determined by a desired positioning of the hydraulic pump 162 relative to a frame 164 of the work vehicle. The construction of the transmission assembly 160 may align closely with that of the transmission assembly of FIGS. 2 and 3, and thus common numbering is used here to identify identical components in the transmission assembly 160.

As shown in FIG. 10, a prime mover such as an engine 38 provides power to an input shaft 52. According to embodiments, the input shaft 52 may provide power directly to a number of gearing, clutch, and control assemblies of the transmission 36 or may provide power to one or more electrical machines 40,42 in order to provide for one of a number of drive type arrangements—including series of parallel arrangements by which the engine and/or electrical machines 40, 42 provide power to the gearing, clutch, and control assemblies of the transmission 36. The transmission 36 is controlled according to a desired mode of operation for the vehicle, such as a forward or reverse mode and/or a selected speed, to provide a corresponding output torque and speed to the output shaft 54—with the output shaft 54 driving operation of the hydraulic pump 162.

According to embodiments, the output shaft 54 may be adjustably positioned relative to the housing 56 and the transmission 36 of the transmission assembly 160 by use of a quill structure 114 that is mounted to the housing 56. Front and rear quills 116, 118 of the quill structure, as previously shown and described in detail in FIGS. 4A and 4B and FIGS. 5A and 5B, may be mounted to the housing 56 in a first orientation 138 or a second orientation 140 in order to position the output shaft 54 at a desired vertical drop distance from the input shaft 52. As shown in FIG. 10, with the quills 116, 118 secured to the housing 56 in a first orientation 138 (FIGS. 4A and 5A), the output shaft 54 is retained within the bearing bores 128 of the quill structure 114 at a position that is below the vertical center point 136 of the quill body 122. Accordingly, a vertical spacing between the input shaft 52 and the output shaft 54 is set at a first vertical distance D1. With the quills 116, 118 secured to the housing 56 in a second orientation 140 (FIGS. 4B and 5B), as shown in phantom in FIG. 10, the output shaft 54 is retained within the bearing bores 128 at a position that is above the vertical center point 136 of the quill body 122. Accordingly, a vertical spacing between the input shaft 52 and the output shaft 54 is set at a second vertical distance D2.

CONCLUSION

The foregoing has thus provided an adjustable drop transmission assembly for a work vehicle that accommodates various work vehicle platforms and their associated differences in drop heights. The adjustable drop transmission assembly includes a quill structure mountable to the transmission housing that may be reoriented to adjust the height between the input shaft and output shaft tied into the transmission assembly. By providing this adjustability of the vertical distance between the input shaft and output shaft, the quill structure allows the use of a common transmission housing across various work vehicle forms. At either of the two orientations of the quill structure, the bearing loads and center distance between meshing gears in the transmission remains constant, such that operation of the transmission assembly does not change regardless of the change in drop height between the input shaft and output shaft.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A transmission assembly for a work vehicle having a prime mover, the transmission assembly comprising:
   a housing configured to accommodate a first transmission shaft and a second transmission shaft;
   a gear arrangement positioned in the housing and configured to provide a selective gear reduction for transmission of power between the first and second transmission shafts; and
   a quill structure secured to the housing and having a front quill and a rear quill supporting the first transmission shaft, the quill structure couplable to the housing in a first orientation and a second orientation to vary a vertical spacing between the first transmission shaft and the second transmission shaft, the quill structure defining a bearing bore that receives the first transmission shaft therein and provides for rotation of the first transmission shaft relative to the quill structure, the bearing bore formed at a location vertically offset from a vertical center point of the quill structure;
   wherein with the quill structure coupled to the housing in the first orientation, the vertical spacing between the first transmission shaft and the second transmission shaft is a first vertical distance; and
   wherein with the quill structure coupled to the housing in the second orientation, the vertical spacing between the first transmission shaft and the second transmission shaft is a second vertical distance.

2. The transmission assembly of claim 1, wherein the first transmission shaft comprises an input shaft driven by the prime mover of the work vehicle and the second transmission shaft comprises an output shaft coupled to an axle of the work vehicle.

3. The transmission assembly of claim 2, wherein the transmission assembly comprises:
   a first electric machine coupled to the input shaft to receive power therefrom, the first electric machine configured to generate an output electrical power responsive to being driven by the input shaft; and
   a second electric machine that receives the output electrical power from the first electric machine;
   wherein the gear arrangement is operably connected to the second electric machine and configured to provide a selective gear reduction for transmission of output power from the second electric machine to the output shaft.

4. The transmission assembly of claim 2, wherein the gear arrangement comprises:
   an input gear coupled to the input shaft; and
   mating gears positioned to mesh with the input gear and be driven by the input gear;
   wherein the input gear meshes with the mating gears at a first mesh point with the quill structure coupled to the housing in the first orientation and meshes with the mating gears at a second mesh point with the quill structure coupled to the housing in the second orientation.

5. The transmission assembly of claim 3, wherein at each of the first mesh point and the second mesh point, center lines of the mating gears and a center line of the input gear form a triangle.

6. A transmission assembly for a work vehicle having a prime mover, the transmission assembly comprising:
   a housing configured to accommodate a first transmission shaft and a second transmission shaft;
   a gear arrangement positioned in the housing and configured to provide a selective gear reduction for transmission of power between the first and second transmission shafts, wherein the gear arrangement comprises:
   an input gear coupled to the input shaft; and
   mating gears positioned to mesh with the input gear and be driven by the input gear;
   wherein the input gear meshes with the mating gears at a first mesh point with the quill structure coupled to the housing in the first orientation and meshes with the mating gears at a second mesh point with the quill structure coupled to the housing in the second orientation; and
   wherein the first mesh point comprises a first gear position below a center line of the mating gears and the second mesh point comprises a second gear position above the center line of the mating gears, the first gear position and the second gear position vertically equidistant from the center line; and
   a quill structure secured to the housing and that supports the first transmission shaft therein, the quill structure couplable to the housing in a first orientation and a second orientation to vary a vertical spacing between the first transmission shaft and the second transmission shaft, the quill structure defining a bearing bore that receives the first transmission shaft therein and provides for rotation of the first transmission shaft relative to the quill structure, the bearing bore formed at a location vertically offset from a vertical center point of the quill structure;
   wherein with the quill structure coupled to the housing in the first orientation, the vertical spacing between the first transmission shaft and the second transmission shaft is a first vertical distance;
   wherein with the quill structure coupled to the housing in the second orientation, the vertical spacing between the first transmission shaft and the second transmission shaft is a second vertical distance.

7. The transmission assembly of claim 1, wherein the second orientation is offset 180 degrees From the first orientation.

8. The transmission assembly of claim 1, wherein each of the front quill and the rear quill includes a quill body, the quill body of the front quill forming the bearing bore and the quill body of the rear boar forming another bearing bore, wherein the bearing bores are formed in the quill bodies at a location vertically offset from a vertical center point of the respective quill body.

9. The transmission assembly of claim 8, wherein the quill body of each of the front and rear quills comprises a lube reservoir and lube passages formed therein configured to deliver lubricant to a shaft bearing positioned in the bearing bore, when the quill body is oriented in either the first orientation or the second orientation.

10. The transmission assembly of claim 8, wherein each quill body comprises an oblong body having first and second ends.

11. A transmission assembly for a work vehicle having a prime mover, the transmission assembly comprising:
  a housing configured to accommodate a first transmission shaft and a second transmission shaft;
  a gear arrangement positioned in the housing and configured to provide a selective gear reduction for transmission of power between an output shaft coupled to a hydraulic pump and an input shaft driven by the prime mover; and
  a quill structure secured to the housing and that supports the first transmission shaft therein, the quill structure couplable to the housing in a first orientation and a second orientation to vary a vertical spacing between the first transmission shaft and the second transmission shaft, the quill structure defining a bearing bore that receives the first transmission shaft therein and provides for rotation of the first transmission shaft relative to the quill structure, the bearing bore formed at a location vertically offset from a vertical center point of the quill structure;
  wherein with the quill structure coupled to the housing in the first orientation, the vertical spacing between the first transmission shaft and the second transmission shaft is a first vertical distance; and
  wherein with the quill structure coupled to the housing in the second orientation, the vertical spacing between the first transmission shaft and the second transmission shaft is a second vertical distance.

12. A work vehicle comprising:
  a prime mover; and
  a transmission assembly operably connected to the prime mover for transmission of power between a first transmission shaft and a second transmission shaft, the transmission assembly comprising:
    a housing;
    a gear arrangement positioned in the housing and configured to provide a selective gear reduction for transmission of power between the first and second transmission shafts; and
    a quill structure secured to the housing and having a front quill and a rear quill configured to support the first transmission shaft within a bearing bore formed in the quill structure that is eccentric from a vertical center point of the quill structure, the quill structure providing for rotation of the first transmission shaft;
    wherein the quill structure is couplable to the housing in a first orientation and a second orientation to vary a vertical spacing between the first transmission shaft and the second transmission shaft such that:
      the vertical spacing between the first transmission shaft and the second transmission shaft is a first vertical distance when the quill structure is coupled to the housing in the first orientation; and
      the vertical spacing between the first transmission shaft and the second transmission shaft is a second vertical distance when the quill structure is coupled to the housing in the second orientation.

13. The work vehicle of claim 12, wherein the second orientation is offset 180 degrees From the first orientation.

14. The work vehicle of claim 12, wherein each of the front quill and the rear quill comprises an oblong quill body having a first end and a second end, with the bearing bore formed in the oblong quill body of the front quill closer to the second end than the first end.

15. The work vehicle of claim 14, wherein the oblong quill body of the front quill comprises a lube reservoir and lube passages formed therein configured to deliver lubricant to a shaft bearing positioned in the bearing bore, with lubricant delivered to the shaft bearing with the oblong quill body of the front quill oriented in either the first orientation or the second orientation.

16. The work vehicle of claim 12, wherein the first transmission shaft comprises an input shaft driven by the prime mover of the work vehicle and the second transmission shaft comprises an output shaft coupled to an axle of the work vehicle.

17. The work vehicle of claim 16, wherein the gear arrangement comprises:
  an input gear coupled to the input shaft; and
  mating gears positioned to mesh with the input gear and be driven by the input gear.

18. The work vehicle of claim 17, wherein the input gear meshes with the mating gears at a first mesh point with the quill structure coupled to the housing in the first orientation and meshes with the mating gears at a second mesh point with the quill structure coupled to the housing in the second orientation.

19. The work vehicle of claim 18, wherein the first mesh point comprises a first gear position below a center line of the mating gears and the second mesh point comprises a second gear position above the center line of the mating gears, the first gear position and the second gear position vertically equidistant from the center line.

20. A work vehicle comprising:
  a prime mover; and
  a transmission assembly operably connected to the prime mover for transmission of power between an output shaft coupled to a hydraulic pump and an input shaft driven by the prime mover, the transmission assembly comprising:
    a housing;
    a gear arrangement positioned in the housing and configured to provide a selective gear reduction for transmission of power between the output shaft and the input shaft; and
    a quill structure secured to the housing and configured to support the output shaft within a bearing bore formed in the quill structure that is eccentric from a vertical center point of the quill structure, the quill structure providing for rotation of the output shaft;
    wherein the quill structure is couplable to the housing in a first orientation and a second orientation to vary a vertical spacing between the output shaft and the input shaft such that:
      the vertical spacing between the output shaft and the input shaft is a first vertical distance when the quill structure is coupled to the housing in the first orientation; and the vertical spacing between the output shaft and the input shaft is a second vertical distance when the quill structure is coupled to the housing in the second orientation.

* * * * *